SIGNALLING SYSTEMS

Filed June 22, 1959 4 Sheets-Sheet 1

WILLIAM ALTAR
EMORY LAKATOS
INVENTORS
BY Frederick M. Arbuckle, agent
Morris Spector
ATTORNEY WILLIAM ALTAR
EMORY LAKATOS
INVENTORS
BY Frederick M. ... agent
Morris Spector,
ATTORNEY

WILLIAM ALTAR
EMORY LAKATOS
INVENTORS

BY

ATTORNEY

Fig. 10 (a) (b) (c) (d)
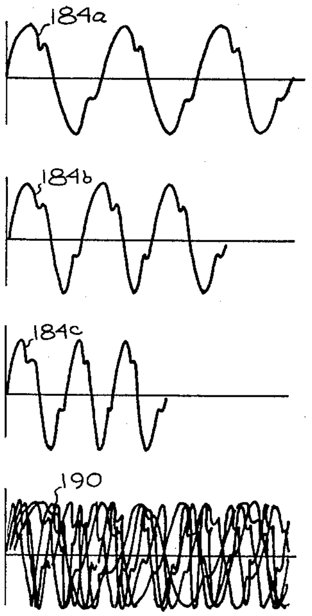
Fig. 11
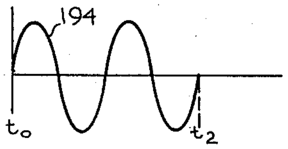
Fig. 12
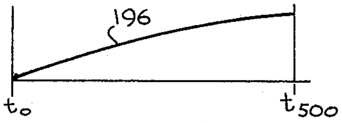
Fig. 13(a), Fig. 13(b)
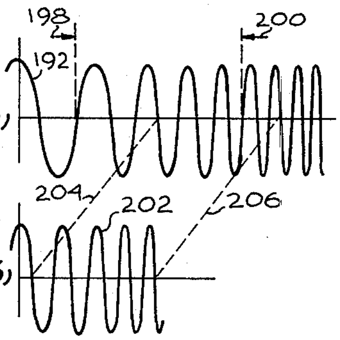
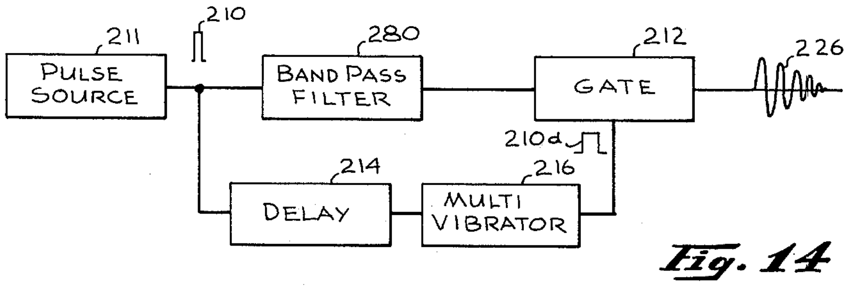
Fig. 14
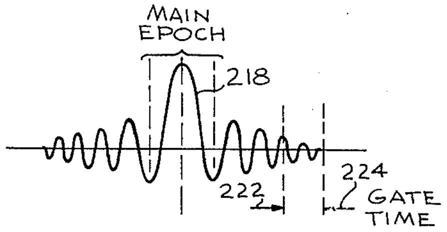
Fig. 15
WILLIAM ALTAR
EMORY LAKATOS
INVENTORS
BY Frederick M. Arbuckle, agent
Morris Spector
ATTORNEY United States Patent Office 3,157,874

Patented Nov. 17, 1964

3,157,874

SIGNALLING SYSTEMS

William Altar, Los Angeles, and Emory Lakatos, Santa Monica, Calif., assignors to Thompson Ramo Wooldridge Inc., Los Angeles, Calif., a corporation of Ohio Filed June 22, 1959, Ser. No. 821,836
6 Claims. (Cl. 343—5)

The present invention relates to improvements in electrical signalling systems and, more particularly, to improvements in electrical signalling systems of the type in which signal correlation techniques are employed to increase effective sensitivity, selectivity, range and reliability of the signalling system.

More specifically, the present invention concerns itself with novel techniques and apparatus for reducing the vulnerability of electrical signalling systems, of the type employing signal correlation techniques, to the possible time distortion of the signals relied upon in the system for effective electrical signalling.

For this and other purposes, the present invention embraces new and useful methods, techniques and apparatus for generating, producing or synthesizing heretofore unrecognized unique classes of Doppler compensated electrical signal waveforms which, in and of themselves, may be said to be of a "Doppler nullifying" or "Doppler tolerating" character, such that useful correlation may be realized between time distorted versions of such signals and undistorted versions thereof.

It is well known in the prior art that the sensitivity, selectivity, range and reliability of certain electrical signalling systems can be greatly increased through the use of signal correlation techniques. In such signalling systems, a transmitter apparatus and a receiver apparatus are arranged in communicating relation to one another. One or more reference records borne on record-bearing media are made available within the receiver. Each record is made in accordance with the wave shape of specific predetermined signals it is contemplated, will be from time to time transmitted by the transmitter apparatus Signal information received by the receiving apparatus is then correlated with the signal information borne by the reference records. When the signal information received by the receiving apparatus usefully correlates with one of the reference records, this correlation is indicated by an output signal or other annunciating means operated by a signal correlation apparatus. A variety of means is known for carrying out the signal correlation process which, from a mathematical standpoint, multiplies and averages the received signal information with recorded reference signal information in the receiver for an infinite number of infinitesimal time displacements between the received signal information and the recorded signal information. In general, when the received signal information is in time coincidence with the recorded signal information, the integrated product of the signals will be maximum. As is known, signal correlation may be carried out by the use of tapped delay lines and a plurality of multiplying and integrating circuits or by various types of optical correlation systems. The mathematical significance of the correlation process is the same in each and all forms of correlators.

For the purposes of illustrating the present invention, it is expedient to consider one well-known form of optical system of signal correlation. In this system, the reference record, at the receiver, is borne by an optical transparency, density variations upon which depict the waveform of the signal it is expected to receive from the transmitter. Received signal information is then recorded by photographic techniques as density variations on a continuous film, such that the amount of light exposed on the film, as it moves, is made proportional to the instantaneous strength of the received signal. After development of the film, the variable density record borne by the film is movingly superimposed in close optical juxtaposition upon the variable density reference record. By continuously illuminating one side of the reference record and moving film, taken in combination, and examining the light transmitted through to the other side of this combination, correlation of the two signals will be indicated by a sharp maximum (or minimum) in the transmitted light. This, in effect, corresponds to a substantially complete special coincidence of density variations on the moving film with those density variations borne by the reference record.

It will, therefore, be seen that should, during the operation of the signalling system, any influence act to time distort the transmitted signal, the received signal, or the signal represented by the reference record, useful correlation between the received signal information and reference signal information may not be possible.

More specifically, it is well known that in active echo-ranging systems in which the echo returned by a moving target is correlated against a stored copy or reference record of the transmitted signal, the Doppler shift produced by the relative motion of the target can easily render correlation impossible. The reason for this lies in the following. The Doppler effect acts to compress or expand the time scale of the received echo relative to the transmitted signal. If the motion of the target is one of a character in which the target is closing upon the receiver, the received echo will be time compressed resulting in dephasing the echo relative to the stored signal in the receiver. If this time distortion is of sufficient magnitude, the correlation tends to vanish. On the other hand, if the target is moving away from the receiver at a substantial velocity, the received echo will be time distorted by expansion of the received echo, similarly rendering useful correlation impossible. Presently known techniques which correct for this undesirable phenomena approach the problem by a trial and error method in which correlation is attempted between the received signal and a variety of different time distorted versions thereof held by separate records at the receiver. This requires a large number of reference records at the receiver and greatly increases the costs of the correlating equipment required at the receiver.

In accordance with the present invention, the deleterious effect of a time distorting influence on the operation of a signal correlation type of signalling system is greatly reduced by conforming the signal transmitted to the receiver and borne by the reference-bearing medium at the receiver, to one of a class of Doppler compensated signal waveforms which may be termed "Doppler nullifying" or "Doppler tolerant."

The present invention is, therefore, based upon the discovery that it is possible to generate or produce signalling waves in accordance with certain synthesizing rules or magnitude-versus-time functions which, in themselves, may be depicted as being Doppler tolerant and of a character such that substantial correlation is possible between time distorted versions of a given function of finite duration and an undistorted version of that same function.

In general, the class of signal waveforms embraced by the present invention is based upon oscillatory functions. If this function is modified by an amplitude modulation function, this latter function must not reverse in sign. This may be co-sinusoid or it may be any phase or frequency modulated wave occupying a preassigned band.

In one form of the present invention, a Doppler nullifying waveform may be realized by combining such an oscillatory wave with a large number of time-distorted versions thereof to form a composite wave. Both the transmitted signal and the reference signal of the above type of signalling systems are then conformed to the resulting composite wave.

In another form of the present invention, the transmitted and reference-recorded wave may be made Doppler tolerant in character, such that the entire energy it represents as primarily attributable to a Doppler tolerant waveform completely defined by one or more waveform components of finite duration, taken in combination, each of which, in itself, is Doppler tolerant. A Doppler tolerant waveform component is, in turn, a waveform of finite duration which is fully definable by a portion of some one of many possible magnitude-versus-time functions, each characterized in that the zero crossings of each entire function, about its symmetrical axis, define time intervals between the zero crossings constituting a geometrical progression, either increasing or decreasing with time. In such a function, any first portion of the set of zero crossings, when subject to linear time distortion, is superimposable upon and substantially congruent with the zero crossings constituting a second portion of the set.

In an even more specific form of the present invention, the oscillatory waveform employed in the signalling system may be generated by exciting a band pass filter with a very short duration pulse and time gating out a portion of the resulting ringing waveform well outside the main epoch of the waveform. This "gated-out" portion is then used as a Doppler compensated signal.

A fuller understanding of the present invention and the advantages flowing therefrom will be gleaned from the following description, especially when read in connection with the accompanying drawings, in which:

FIGURE 1, by block diagram, illustrates a general form of signalling system in which the present invention finds use;

FIGURE 8 through FIGURE 10 are graphical representations of waveforms useful in understanding how the apparatus depicted in FIGURE 7 may be employed to produce Doppler nullifying electrical signal waveforms;

FIGURE 11 through FIGURE 13 are graphical representations of electrical signals useful in understanding how the apparatus of FIGURE 7 may be employed to generate Doppler tolerant electrical signal waveforms;

FIGURE 14 is a block diagrammatic representation of apparatus useful in developing a simple Doppler compensated signal in accordance with the present invention; and FIGURE 15 is a graphical representation of an electrical signal waveform useful in understanding the operation of the apparatus in FIGURE 14.

Figure 1:
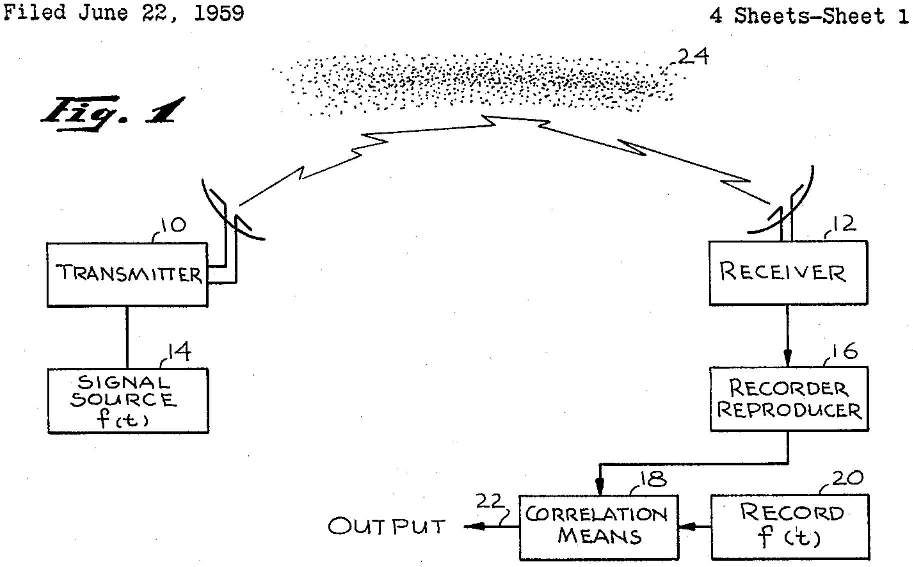

Before giving more exhaustive consideration to the various forms which the present invention may take, attention will be given in more detail to some of the more typical problems which the present invention is useful in solving. For example, in FIGURE 1 there is illustrated a typical signal correlation type signalling system. There is indicated in block diagram form a transmitter 10 adapted to launch by propagation or transmit a wave to a receiver 12. Although an electromagnetic wave signalling system is depicted, it will be understood, as the specification proceeds, that the present invention is in no way limited to any specific form of signalling system or mode of wave propagation. The waveform of the propagated wave or signal transmitted by the transmitter 10 is controlled in accordance with the waveform of the signal delivered by a signal source 14 which may be mathematically represented as a funtcion $f(t)$. In the system under consideration, the output signal from the receiver 12 is applied to a recorder reproducer mechanism 16 which is, in turn, coupled to some form of signal correlation means 18. Also applied to another input of the signal correlation means 18 is the output of a record bearing signal reproducing means 20. The arrangement thus provided is typical of what may be considered a signal correlation signalling system. In such systems, the waveform of the signal borne by the record bearing means 20 is depicted by the same mathematical function $f(t)$ as that defining the waveform of the signal delivered by the signal source 14 at the transmitting terminal of the system. It is by virtue of this fact that a high degree of receiver selectivity may be realized.

As brought out hereinabove, the signal correlation means 18 may take a variety of forms. Its function, however, is to compare the waveform of all signals received by the receiver 12 and later reproduced by the recorder-reproducer means 16, with the waveform represented by the record bearing means 20. In operation, all signals received by the receiver 12 are recorded on some medium within the recorder-reproducer means 16. At a time subsequent to the recording of received signals, the recorder reproducer 16 is caused to "play back" or reproduce these recorded signals. As they are played back, the correlation means 18 cooperates with the record-bearing means 20 to develop an output signal at terminal 22 whenever the waveform of received signal information agrees with the waveform borne by the record-bearing means 20. In this way, a useful output signal is made to appear at terminal 22 of the correlator means only in response to the selective reception by the receiver 12 of a signal having a waveform corresponding to the function $f(t)$. Alternatively, in some signal correlation systems, the recorder-reproducer means 16 may be omitted and the signals delivered by the receiver directly applied to the correlation means.

However, during operation of the signalling system, should the receiver 12 receive signal information depicted by waveforms substantially different from the function $f(t)$, the correlation means 18 will not be able to produce a useful correlation between the waveform borne by the record-bearing means received signal information. Under these conditions, no useful output signal will be delivered by the correlation means.

Such a system as just described, in connection with FIGURE 1, is well known in the art but is subject to certain limitations if, during the operation of the signalling system, some influence should act to time distort either the wave derived from signal source 14 at the transmitter, the signal received by the receiver 12, the signal delivered to the correlation means 18 from the recorder reproducer 16, or the signal delivered by the record-bearing means 20 to the correlation means 18. Such time distortion may result from a variety of causes. For example, if the signal or wave launched by the transmitter 10 encounters a reflective layer in the atmosphere such as indicated at 24, and is thence reflected to the receiver 12, a time distortion of the wave received by the receiver 12 may develop owing to motion of the layer 24. Likewise, should the signal source 14 at the transmitter and the record-bearing means 20 at the receiver be of the magnetic drum variety, a change in the relative speeds of the drums would produce a time expansion or compression of the waveforms which the correlation means 18 attempts to correlate. If the time distortion thus arising from these or other causes is of sufficient magnitude, the correlation means 18 in the receiver system will be unable to produce a useful output.

Figure 2:
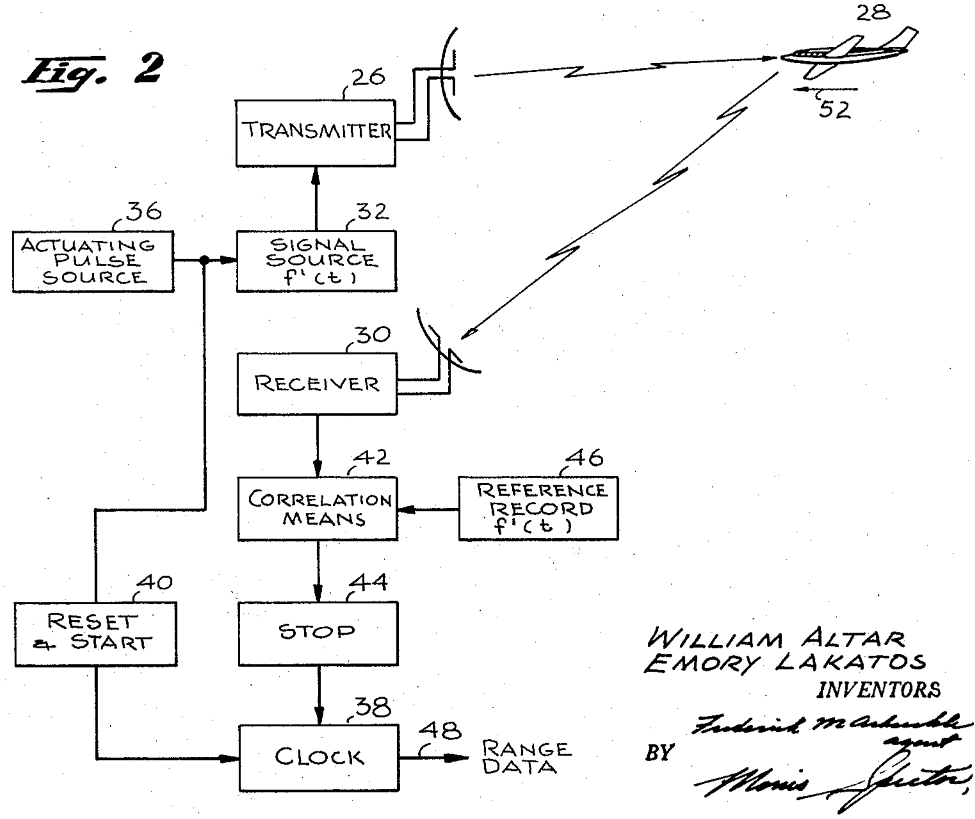
FIGURE 2 is a block diagram representation of an echo-ranging type of signalling system to which the present invention is usefully applicable.

Similarly, in echo-ranging devices or systems of the type generally shown in FIGURE 2, time distortion of the return echo may prevent the use of signal correlation techniques in the selective detection of received echoes. Specifically, in FIGURE 2, a typical echo-ranging system employing signal correlation techniques is shown in which a transmitter 26 is adapted to transmit pulses of predetermined waveform to a target 28. Upon reflection of these pulses from the target 28, they are received by a receiver 30. (The pulses reflected from the target 28 to the receiver 30 are sometimes termed "echoes.") The waveform of the signal transmitted by the transmitter 26 is, in turn, controlled by a signal source 32 and for purposes of illustration is defined by some mathematical function $f'(t)$. The times at which the signal source 32 actuates the transmitter 26 are, in turn, controlled by signals derived from an actuation pulse source 36.

Still referring to FIGURE 2, the range or distance of the target 28 with respect to the receiver 30 is measured by means of a time-measuring apparatus generally indicated as a clock at 38. The clock 38 is reset and started in its time-measuring action by means of a reset and start means 40 which is, in turn, actuated by the actuating pulses delivered by source 32. Thus, when the signal waveform is launched by the transmitter 26, the clock 38 is reset and begins to measure elapsed time. The echo received by the receiver from the target 28 is then applied to a correlation means 42, the output of which operates a stop circuit 44 to terminate the time measuring action of the clock 38. The time required for the transmitted wave to reach the target, be reflected therefrom and sensed by the receiver is a direct function of target range. Thus, when received signal information delivered to the correlation means 42 agrees with the waveform borne by the record-bearing medium within the reference record means 46, the correlation means 42 will deliver an output signal to stop the clock 38 and deliver (elapsed time) range data at terminal 48.

The apparatus of FIGURE 2 thus far described also typifies prior art techniques. Again, however, successful operation of the echo-ranging system of FIGURE 2 may be inhibited by the time distortion imposed on the received echo signal owing to the possibility of relative motion of the target 28 with respect to both the transmitter 26 and the receiver 30. If target motion exists, a time distortion of the signal received by the receiver 30 will result. If the target motion is closing in character, as depicted by the arrow 52, the resulting distortion will be such that the received echo will be a time compressed version of the signal delivered to the transmitter by the signal source 32. This time distortion, due to motion of the target 52, is commonly referred to as "Doppler shift." Therefore, even though the reference record signal producing means 46 at the receiver produces identically the same signal waveform as the signal source 32 at the transmitter, the signal correlation means 42 will generally be unable to provide a sufficiently useful correlation between the time compressed echo and the reference record signal to actuate the stop 44 for stopping the clock 38.

Figures 3A, 3B:
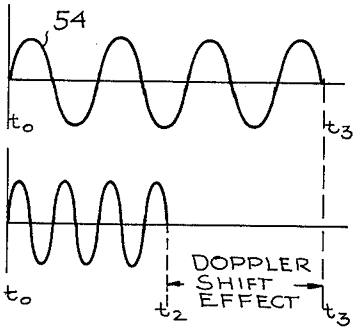
FIGURE 3 is a graphical representation of the character of the time distortion produced on electrical signals by Doppler shift in an echo-ranging system of the character illustrated in FIGURE 2.

A better appreciation of the effect of Doppler shift on possible signal correlation by any signal correlation means may be obtained by reference to the waveforms shown in FIGURES 3*a* and 3*b* to be later followed by consideration of FIGURE 4 and FIGURE 5. Let it be assumed that in the arrangement of FIGURE 2 the function $f'(t)$ to which the signal source 32 and the reference record 46 are conformed are depictable by the wave 54 in FIGURE 3*a*. Due to the relative motion of the target 52 with respect to the transmitter and receiver in FIGURE 2, the 4 cycles shown of the wave 54, which initially embrace a period of time from $t_0$ to $t_3$, now are time-distorted to occupy the period of time $t_0$ to time $t_2$ in FIGURE 3*b*. The actual Doppler shift effect is, therefore, graphically illustrated by the time interval between $t_2$ and $t_3$ in FIGURE 3*b*. The specific Doppler effect produced by a closing velocity between the target and the transmitter-receiver combination of FIGURE 2 tends to increase the effective frequency of the oscillatory echo signal. It will be understood, however, that were target 28 in FIGURE 2 to move away from the transmitter-receiver combination, the effect on the signal 54 in FIGURE 3*a* would be to decrease its effective frequency.

Figures 4, 5:
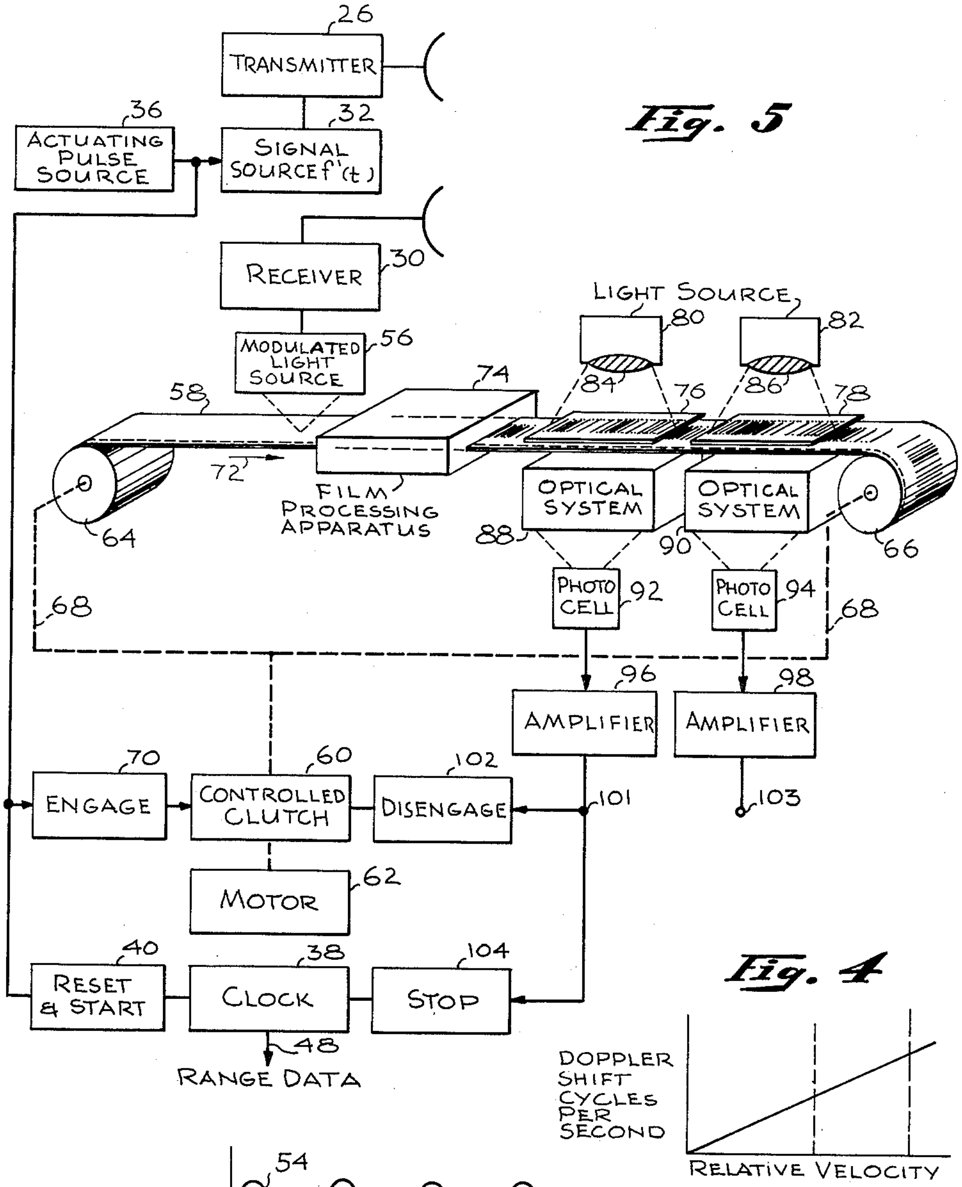
FIGURE 4 is a graphical illustration of the relationship between the magnitude of Doppler shift produced by the motion of a target moving at different values of velocity with respect to the receiver of an echo-ranging system of the character shown in FIGURE 2.
FIGURE 5 is a block diagram and symbolic representation of one form of signal correlation apparatus useful in the signalling systems shown in FIGURES 1 and 2.

The magnitude of the Doppler shift in cycles per second resulting from the relative velocity between a target such as 28 in FIGURE 2, and an echo-ranging system, is depicted in FIGURE 4. As the graph in FIGURE 4 shows, the magnitude of the Doppler shift, in cycles per second, at any given frequency, is a positive linear function of the magnitude of the relative velocity between the target and the echo-ranging system. Furthermore, as will be immediately apparent, the magnitude of the Doppler shift in cycles per second, at any given velocity, is directly proportional to the frequency of the transmitted oscillatory wave. Thus, Doppler shift effects may produce a substantial dephasing of the components of a signal waveform.

A clearer understanding of how time distortion acts to inhibit or prevent useful signal correlation between the return echo of an echo-ranging system and a reference record of the original transmitted wave may be obtained by reference to FIGURE 5. Here, by way of example, is shown one form of system useful as the recorder-reproducer optical correlation means 16 and 18 shown in FIGURE 1, and the correlation means 42, in FIGURE 2. The arrangement shown in FIGURE 5 will first be considered in connection with the requirements of the echo-ranging system in FIGURE 2. For illustrative clarity, some of the components shown in block form in FIGURE 2 have been included in FIGURE 5 and such of these components in FIGURE 2, as appear in FIGURE 5, have been given reference numerals corresponding to those assigned these components in FIGURE 2. In FIGURE 5, as in FIGURE 2, an echo-ranging system is shown in which the actuating pulse source 36 conditionally actuates signal source 32 to drive or activate the transmitter 26. The waveform of the signal delivered by the signal source 32 is again indicated as corresponding to some mathematical function $f'(t)$. Also, as in FIGURE 2, the pulse delivered by the actuating pulse source 36, in FIGURE 5, is applied to a reset and start circuit 40 for a clock 38. In FIGURE 5, however, the output of the receiver 30 is coupled to a modulated light source 56 which includes a suitable optical system for imposing a sharp slit-like beam of light on a moving light-sensitive photographic film 58. The motion of the photographic film 58 is controlled by a controlled clutch 60 which couples a motor 62 to the film reeling spools 64 and 66. Dotted lines 68 indicate suitable mechanical coupling from the controlled clutch 60 to the spools 64 and 66. Upon the occurrence of an actuating pulse which causes the transmitter 26 to transmit or launch a ranging pulse, the controlled clutch 60 is engaged by means of the engage means 70, which is also electrically responsive to the pulse supplied by the actuating pulse 36. The photographic film 58 then begins to move in the direction of arrow 72 and the modulated light source 56, controlled by the amplitude of the signals delivered by the receiver 30 exposes the film to a varying intensity slit-like beam of light. After exposure to the light beam, the film is caused to pass through a rapid-acting film processing apparatus 74 of any suitable conventional type. The film 58, upon emerging from the film processing apparatus 74, is then drawn by spool 66 past one or more optical reference transparencies, shown at 76 and 78, respectively.

Still considering the arrangement of FIGURE 5, the optical transparencies 76 and 78 comprise a transparent plate or reference strip having delineated thereon a variable density record of certain waveforms it is desired to detect in the output of the receiver 30. These transparencies 76 and 78 may be made in the same fashion as the variable density record is made on the film strip 58 and should have a scale of density variations per unit length for a given frequency, corresponding to the scale which would be produced, for the same frequency, by the modulated light source 56 acting upon the moving film strip 58. Fixed intensity light sources are then provided at 80 and 82 which act through suitable optical systems indicated at 84 and 86 to uniformly illuminate the reference record strips 76 and 78. In practice, the reference strips 76 and 78 are substantially in direct contact with the moving film 58 to permit virtually direct optical superimposition of one upon the other. The light passing through the reference strips 76 and 78, taken in combination with the moving film 58, is collected by respective optical systems 88 and 90 and directed to respective photo cells 92 and 94. The output signals from the photo cells 92 and 94 are directly applied to suitable amplifiers 96 and 98 to develop useful correlation output signals at terminals 101 and 103, respectively.

In the operation of the arrangement shown in FIGURE 5, should the waveform of a signal received by the receiver 30 agree with the waveform depicted by the density variations in reference record strips 76 and 78, the intensity of the light or total light flux received by the photo cells 92 or 94 will generally be maximized. It will be noted, however, that should density variations borne by the reference strips 76 and 78 be a photographically negative version of the density variations delineated on the photographic film 58, the light received by the photo cells 92 and 94, upon the occasion of signal correlation would be minimized. In any case, the output signals delivered by the amplifiers 96 and 98, as they appear at terminals 101 and 103, will noticeably change to annunciate the event of substantial correlation between received signals, as recorded on the photographic film 58, and reference signals depicted by density variations on reference strips 76 and 78.

In the arrangement of FIGURE 5, the output signal available at terminal 101 is applied to a disengage means 102 so that upon the event of signal correlation, the controlled clutch 60 is caused to stop the motion of the photographic film 58. Simultaneously, a correlation output signal appearing at the terminal 101 acts upon a stop means 104 to stop the time-measuring action of clock 38. Thus, should the signal transmitted by the transmitter 26 be reflected to the receiver 30 with no time distortion, as would attend normal and ideal conditions during which the target 28, in FIGURE 2, happened to be stationary, the received echo would optically correlate with the reference waveform recorded on reference strip 76 and cause the stopping of clock 38. Range data could be then read directly from terminal 48 of the clock time lapse measuring means 38.

Alternatively, if the general form of optical correlation apparatus shown in FIGURE 5 were to be used in conjunction with the signalling system of FIGURE 1, the controlled clutch arrangement and clock time lapse measuring system, shown in FIGURE 5, could be omitted. The transmitter 26 could then be provided with at least one signal source productive of a waveform definable by a mathematical function $f(t)$, as well as a second signal source developing a signal waveform definable by a different mathematical function $f'(t)$. The reference strips 76 and 78, in FIGURE 5, may then be made to bear density variations corresponding to the mathematical functions represented by these two alternative signals conditionally transmitted by the transmitter 10 in FIGURE 1. Obviously, under conditions of no time distortion, the transmission of either signal waveform could be detected by respectively examining the correlation output terminals 101 and 103 in FIGURE 5.

Although the optical correlation arrangement illustrated in FIGURE 5 has been described as useful in a signalling system environment free of substantial time distortion influences, it is clear that time distortion influences of substantial but unknown magnitudes may well prevent the achievement of objects for which the signalling system is intended. In addition to possible moving target Doppler shift effects noted above, other equivalent time distortion effects may arise which, for example, may be attributable to a departure of the nominal or desired rate at which the photographic film 58 is caused to move during recording of the incoming signals. Similarly the variable density reference strips 76 and 78 may shrink or expand as a result of temperature and humidity changes or long-term aging. Equivalent sources and causes of time distortion will be immediately recognized as potentially present in all forms of signal correlation systems. Regardless of the specific nature or cause of the time distortion, however, the effect thereof may be likened unto and considered equivalent to the time distortion produced by changes in a time varying medium. Thus a solution to the Doppler shift problem in signal correlation signalling systems offers a solution to practically all problems arising from time distortion therein from whatever cause.

In reducing the vulnerability of signal correlation type signalling systems to time distortion influences, the present invention restricts the waveforms of the signals launched by the transmitter to those falling in certain unique classes of waveforms which may be considered as being in themselves precompensated for time distortion effects—or more simply, Doppler compensated. As will be brought out in more detail hereinafter, any member of such waveform classes may be usefully correlated with a time distorted version of itself.

A more general class of such Doppler compensated waveforms falling within the purview of the present invention may be thought of as being formed by a family of time-altered or time-distorted versions of some oscillating function. This oscillating function may additionally include an envelope or amplitude modulation function, but the envelope function itself must not change sign.

For example, choose any signalling function.

$$S_0(t)=E_0(t)O_0(t) \qquad (1)$$

where $E_0(t)$ is an envelope function and $O_0(t)$ is an oscillating function of unit peak amplitude. (If $O_0(t)$ is not of constant peak amplitude, it can always be made so by use of an auxiliary envelope function and absorbing the latter in $E_0(t)$.) The former must not reverse sign. The latter may be a pure cosinusoid, or it may be any phase or frequency modulated wave, occupying a preassigned band.

In accordance with the present invention, a family of time-altered versions of (1) is now formed, with the nature of this time alteration being, by way of example, that of time compression. The $j$th member of this family is then of the form $$S_j(t)=E_0[t(1+k)^j]O_0[t(1+k)^j] \qquad (2)$$

where $k$ is a number small compared to unity.

We now add all these members up, to some number $J+1$, giving $$S(t)=\sum_{j=0}^{J} E_0[t(1+k)^j]O_0[t(1+k)^j] \qquad (3)$$

We now transmit $S(t)$ and also store a copy of it as a reference record for the correlation means such as by reference record 46 in FIGURE 2.

Let $Q(t)$ be the echo received by the receiver, such as the receiver 30 in FIGURE 2. The functional form of this echo differs from $S(t)$ in that there will be a delay $t_0$ and a Doppler time-compression factor $1/(1+\beta)$. That is, the argument $t(1+k)^j$ is to be replaced by $$(t-t_0)(1+k)^j(1+\beta)$$

in Equation 3 above.

It is convenient for analytical purposes to assume that the target motion just happens to be such that we can set $$1+\beta=(1+k)^m$$

$m$ being an integer, much smaller than J. This simply means that target speeds are assumed to change in small increments.

To avoid undue labor, it is also convenient to assume that the time delay $t_0$ has been determined and thus, we need only deal with peak value of the correlation function. Calling this $R(o)$, we have $$R(o)=\frac{1}{T}\int_0^T S(t)Q(t)dt$$

(Most of the discussion here will deal with correlations of finite wave trains.) Then $$R(o)=\frac{1}{T}\int_0^T \sum_{j=0}^{J}\sum_{i=0}^{J}\{E_0[t(1+k)^i]E_0[t(1+k)^{i+m}] O_0[t(1+k)^i]O_0[t(1+k)^{i+m}]\}dt \quad (4)$$

Now any oscillating function of constant peak amplitude can be written as the cosine of a phase angle which varies suitably with time. Thus $$O_0[t(1+k)^j]=\cos\phi[t(1+k)^j]-\cos\phi_j$$
$$O_0[t(1+k)^{i+m}]=\cos\phi[t(1+k)^{i+m}]-\cos\phi_{i+m}$$

and in terms of the $\phi$'s, $$\cos\phi_j\cos\phi_{i+m}=\tfrac{1}{2}[\cos(\phi_j-\phi_{i+m})+\cos(\phi_j+\phi_{i+m})] \quad (5)$$

If this is put back into (4), it can be shown that contribution of the $\phi_j+\phi_{i+m}$ terms is very small compared to those resulting from $\phi_j-\phi_{i+m}$ terms even when T is finite. In particular we note that when $j=i+m$, the terms $\cos(\phi_j-\phi_{i+m})=1$.

Thus, there is shown to exist components in the Doppler shifted echo which effectively beat against certain components in the stored reference signal of the signal correlation receiver to give constant terms insofar as the oscillating functions are concerned. In fact, there are $J+1-m$ of these, all of which add, except for such effects as the envelope functions themselves may have. This permits useful signal correlation to be realized between any member of this class of waveforms and a time distorted version thereof.

In order to generate, produce or synthesize members of this class of waveforms, it is contemplated by the present invention that the summation equation shown at (3) above can be programmed into a suitable known form of digital to analog computer and the resulting time-versus-amplitude data obtained used to electrically or optically synthesize a reproducible record of one of many possible Doppler compensated waveforms. However, in an illustrative form of the invention, these and such other Doppler compensated signals, as are envisioned by the present invention, may be developed by means of the apparatuses illustrated in FIGURES 6 and 7.

Figure 6:
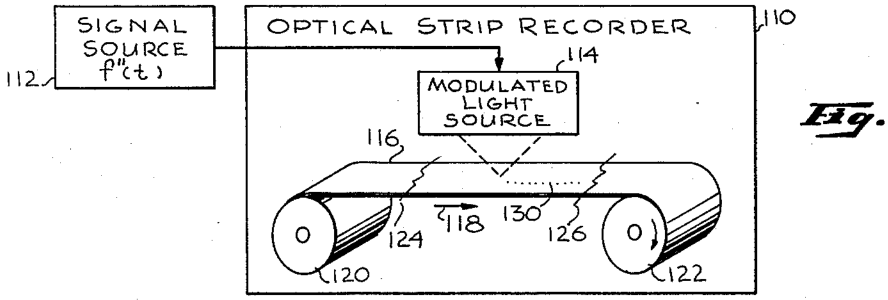
FIGURE 6 is a block diagram and symbolic representation of an optical strip recorder useful in imposing on a photographic record-bearing medium, a variable density representation of an electrical signal waveform.

The arrangement of FIGURE 6 comprises nothing more than a simple photographic optical strip recorder 110 to which is applied a signal from a signal source 112. The signal source 112 must, in accordance with the present invention, provide a signal $f''(t)$ falling within the class of signals defined in Equation 1 above, that is, it is defined by an oscillating function and, if amplitude modulated, the amplitude modulation function itself must not reverse sign. The signal from the signal source 112 when applied to the optical strip recorder 110 causes modulation of a modulated light source 114 within the recorder.

In the recorder 110, in FIGURE 6, a photographic film strip 116 adapted for movement in the direction of arrow 118 is provided, the film itself being driven by reeling spools 120 and 122. Suitable drive means for the reeling spools 120 and 122, although not shown, will, of course, be provided. This for example, may be similar to the arrangement shown in FIGURE 5. The purpose of the apparatus shown in FIGURE 6 is to develop an optical transparency of variable density which may be used in the signal generating systems of FIGURE 7. (Such apparatus may also be used to produce the reference strips 76 and 78 employed in the optical correlation apparatus of FIGURE 5, described above.) Thus, after recording the signal 112 over a predetedmined time interval, the optical strip recorder 110 is stopped. The photographic film therein is suitably processed and a portion thereof, such as that portion 130, defined between jagged lines 124 and 126, cut out and removed for use as a reference record 130 in the arrangement of FIGURE 7.

Figure 7:
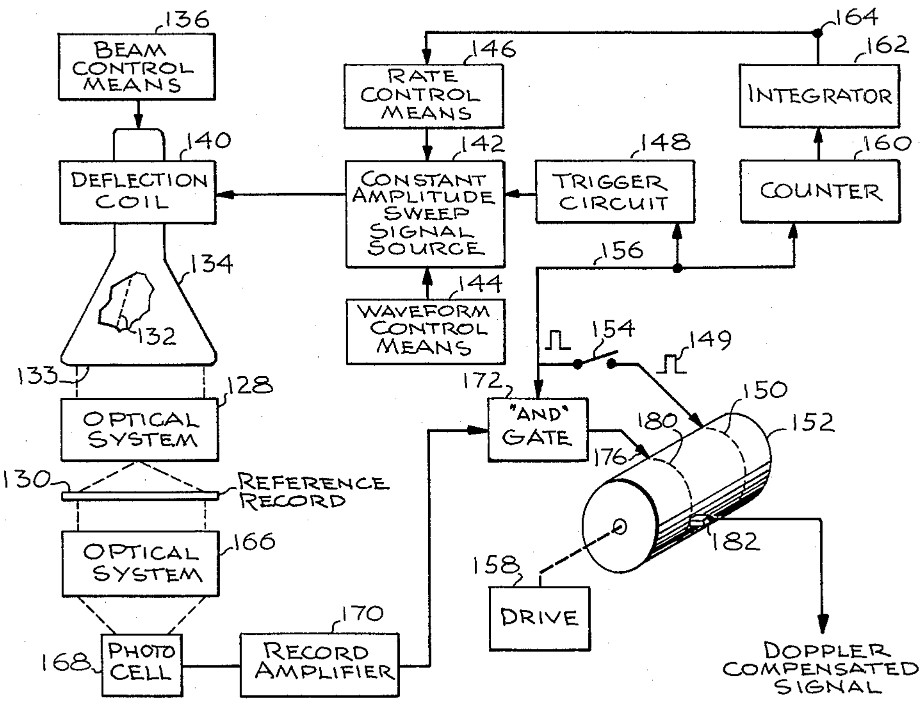
FIGURE 7 is a block and symbolic representation of apparatus suitable for generating, synthesizing or producing signals of the Doppler compensated classes envisioned by the present invention.

In FIGURE 7, the reference record 130, developed by the apparatus of FIGURE 6 is removed and placed in active relation to an optical system 128. The optical system 128, in turn, accepts and directs upon the reference record 130, the fluorescent image of an electron beam 132, within a cathode ray tube kinescope 134 as it impinges a phosphor target 133. The kinescope 134 may be of the conventional cathode ray tube oscilloscope variety or may be one of a large variety of flying spot scanning tubes well known in the art of television. Suitable beam forming and control means 136 are appropriately coupled to the structure of the kinescope 134 so as to form and focus the electron beam 132 on the phosphor fluorescent target 133 of the kinescope. Deflection means for controlling the position of the beam 132 are represented by the deflection coil 140 surrounding the neck of the kinescope 134. The deflection coil 140 is, in turn, driven by a constant amplitude sweep signal source 142. The sweep signal source 142 is provided with an appropriate means for controlling the waveform of the signal delivered to the deflection coil 140. This waveform control means is indicated at 144. Also, the sweep signal source 142 is provided with means for controlling the rate at which the beam 132 is caused to scan across the phosphor target of the kinescope 134. This rate-control means is illustrated at 146. It will be understood that the sweep signal source 142, therefore, causes the beam 132 to deflect back and forth across a straight line on the target of the kinescope 134. The amplitude of the deflection is made such that image of beam on the target is, in turn, caused to scan a predetermined portion of the reference record 130. The beam-control means 136 can be adjusted to conform the image of the beam on the fluorescent surface 133 to that of an elongated, but very thin, slit. It is generally desirable that the intensity of the beam 132 be sufficiently great to effectively saturate the fluorescent material 133 so that the intensity of light emitted by the beam, as it sweeps across the target 133, is substantially independent of the rate at which it is deflected.

Further considering the arrangement of FIGURE 7, the action of the contsant amplitude sweep signal source is controlled, in its initiation, by a trigger circuit 148. The trigger circuit 148 is, in turn, controlled by the successive reproduction of a synchronizing pulse 149 recorded on track 150 of a magnetic drum recorder 152. This pulse is applied through normally open switch 154, through circuit path 156, to the trigger circuit 148. Thus, when the switch 154 is closed, the trigger circuit 148 is fired once for every revolution of the magnetic recording drum 152. Some suitable form of drive means for the drum 152 is indicated at 158.

The synchronizing pulse train made available by the rotation of drum 152 in FIGURE 7 and applied to trigger circuit 148 through switch 154 is also applied to some form of counter circuit 160. It is the function of the counter circuit 160 to in effect register the number of revolutions of the magnetic drum 152 during the closing of switch 154. The output of the counter 160 is applied to an integrator circuit 162 so that an electrical control potential may be made to appear at output terminal 164. The magniude of this control potential is caused to change in discrete steps for each revolution of the drum 152. This potential is in turn applied to the rate-control means 146 so that each revolution of the drum, the rate at which the electron beam 132 sweeps across the surface of the cathode ray tube, may be made to change. The light passing through the reference record 130, by virtue of the scanning action of the electron beam image focused thereon by the optical system 128, is collected by an optical system 166 and directed to a light-sensitive photocell 168. The output of the photocell 168 is, in turn, applied to a magnetic recording amplifier, designated simply as record amplifier 170. The output of the record amplifier 170 is, in turn, applied to one input of a gate circuit indicated at 172. Gate circuit 172 may be of the "and" variety and normally acts to pass signals from the output of the record amplifier 170 to the magnetic recording head 176 except for the interval of the synchronizing pulse 149. By this means, signals developed by the photocell 168 are prevented from being recorded on track 180 of the drum 152 during the return time of the beam 132, to a reference position on the reference record 130.

It can be seen from the above description of the arrangement in FIGURE 7 that the means provided therein permits a Doppler compensated signal to be developed or synthesized, in accordance with the present invention, on track 180 of the magnetic drum 152. This signal may be successively reproduced by a magnetic pick-up head 182 acting on the track 180 of the drum 152. The apparatus shown in FIGURE 7 is quite flexible in its operation since controlled magnitudes of linear or nonlinear time distortion, either compressive or expansive in nature, may be imposed upon any type of signal waveform. Moreover, any number of discretely different time distorted versions of a given waveform may be superimposed upon the track 180 of drum 152 to develop a resultant Doppler compensated signal in accordance with the concepts of the present invention set forth above.

Figure 8:
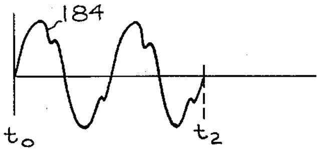
Figure 9:
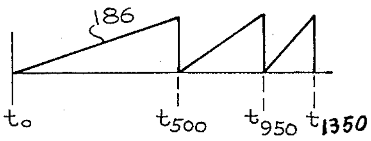

More specifically, let it be assumed that the signal source 112 in FIGURE 6 be adapted to deliver a complex waveform of the character illustrated at 184 in FIGURE 8. Although successive cycles of the waveform in FIGURE 8 have been illustratively indicated as being similar, it will be understood from the above mathematical treatment that this is not in itself necessary. In order to develop a Doppler compensated signal waveform in accordance with the present invention, a reference record is made of the waveform 184 as shown in FIGURE 8 by means of the apparatus previously described in FIGURE 6. The resulting reference record is then positioned as shown at 130 in FIGURE 7. The constant amplitude sweep signal source 142 is then caused, by means of the waveform control means 144, to deliver a linear sawtooth of current to the deflection coil 140 in FIGURE 7. This sawtooth of current is illustrated generally at 186 in FIGURE 9. It is noted that successive cycles of the sawtooth 186 are of the same amplitude but of progressively shorter duration. Thus, by way of example, the first cycles of the sawtoth waveform reaches its maximum amplitude at time T500. The second cycle reaches its maximum amplitude at time T950 and while the third cycle reaches its maximum at time T1350. This change in the effective rate of the sawtooth signal 186 for each revolution of the drum 152 is, as hereinabove explained, produced by the action of the rate-control means 146 which responds to the output of the integrator 162. Thus, with the switch 154 closed and the drum 152 operating at some constant speed, there will be successively recorded on the track 180 a series of time-compressed versions of the waveform 184. The longer the switch 154 remains closed, the more time-compressed versions of the signal 184 will effectively be added unto itself to produce a Doppler compensated signal. This is shown generally by the waveforms 184*a*, 184*b*, and 184*c* in FIGURES 10*a* through 10*c*, respectively. The resultant Doppler compensated signal as reproduced by magnetic reproducing head 182 will then be a complex waveform which, if a sufficient number of time-compressed versions of the basic waveform 184 are added together, will produce a noise-like signal, indicated generally at 190 in FIGURE 10*d*.

It will be further apparent, that by inverting the sign of the control action imposed on the rate control means 146 from the control signal delivered by the integrator 162, successive recorded versions of the reference record may be time expanded. The extent of such expansion is, of course, governed by the capacity of the drum recorder 152. Also, as will later be seen, the waveform of the sweep signal source may be modified to produce other than a linear time expansion or compression of the waveform recorded on the reference record 130.

It will be further understood that the production of a Doppler compensated signal waveform, in accordance with the present invention, is in no way limited to the simultaneous time compression of both an envelope function and an oscillatory function. It is possible to merely record an oscillatory function having no amplitude modulation component upon the reference record 130, in FIGURE 7, and produce, by the above-described techniques, a composite signal, on track 180 of the drum recorder 152, which represents the addition of as many time compressed (or time expanded versions) of this oscillatory signal as one desires. Amplitude modulation, in accordance with any non sign reversing function, may then be imposed on the Doppler compensated signal, prior to its use, by many well known modulation techniques.

The general form of a Doppler compensated wave, mathematically represented by Equation 2 above, may be further generalized, in accordance with the present invention, by applying a scale factor $a(j)$ to each $E_j(t)$. The most general form of Equation 2 then becomes $$S_j = a(j)E_j(t)O_0[t(1+k)^j] \tag{2a}$$

One possible choice of the quantities A, $E_0$ and $O_0$ may be made as follows $$E_0(t)=1 \quad a(j)=1$$

$$O_0(t)=\sin\left[\omega_0 t+\frac{K}{\omega_m}\sin\omega_m t\right]$$

to produce a frequency modulated function. In this case, the signal which would be transmitted, in accordance with the present invention, is $$S(t)=\sum_{j=0}^{J}\sin\left[\omega_0 t(1+k)^j+\frac{K}{\omega_m}\sin\omega_m t(1+k)^j\right]$$

Still further, by choosing $$E_0(t)=1$$
$$a(j)=a_j$$

and $$O_0(t)=\sin A_0 \ln(t-t\infty)$$

the resulting transmitted signal will appear as $$S(t)=\sum_{j=0}^{J}a_j\sin A_0\ln[t(1+k)^j-t\infty]$$

As with all the previous cases, $S(t)$ is a Doppler compensated or Doppler tolerant function. This special choice of $O_0(t)$ is, in accordance with the present invention, of specific value in its own right because even standing by itself, it may be termed a "Doppler tolerant function." That is to say, if a portion of the specific function $O_0(t)$ is transmitted, without adding unto itself time-compressed versions thereof, the echo signal $Q(t)$ has the property that it will have identically the same shape as another portion of $O_0(t)$. This will be seen by reference to FIGURES 13*a* and 13*b*.

However, before examining in detail a specific Doppler tolerant signal which falls within the class of signals defined in the above equation $$S(t)=\sum_{j=0}^{J} a_j \sin A_0 \ln [t(1+k)^j - t_\infty]$$

consideration will be first given to how signal may be synthesized. Referring back to the apparatus shown in FIGURES 6 and 7, the logarithmically time-compressed Doppler tolerant signal shown at 192, in FIGURE 13*a*, may, for example, be synthesized as follows. Let the signal source 112, of FIGURE 6, be purely sinusoidal in character. The reference record 130, in FIGURE 7 will then bear a spatial variable density record of a sinusoidal signal, of a character such as shown at 194, in FIGURE 11. The waveform control means 144, in FIGURE 7, is then changed to cause the sweep-signal source 142 to deliver a waveform of current to the deflection coil 140 which is logarithmic in character. This logarithmic waveform may appear as generally depicted at 196, in FIGURE 12. The velocity of the light beam scanning the reference record 130 will vary in accordance with the logarithmic nature of the deflection waveform 196. As a consequence, the waveform of the signal recorded on the track 180 of drum 152, in FIGURE 7, will appear as shown at 192, in FIGURE 13*a*. It is here noted that the resulting waveform 192 defines, about its axis, a set of zero crossings which, in turn, define successive periods of time, the durations of which conform to a decreasing geometric progression. In other words, the logarithmic magnitude-versus-time function upon which the waveform 192, illustrated in FIGURE 13*a*, is based, is of a character such that if it were expressed on a suitable logarithmic time scale, the function would appear periodic like the waveform 194, in FIGURE 11.

The waveform 192, in FIGURE 13*a*, has peculiar properties in that if it is time compressed or expanded as by Doppler shift time distortion influences in an echo-ranging system the zero crossings of the time compressed echo will be substantially superimposable upon and substantially congruent with some set of the zero crossings in the original waveform. For example, let that portion of the waveform 192, defined between the arrows 198 and 200, be employed as the launching wave of the signalling system. Upon time compression due to Doppler shift, the return echo will appear as shown at 202, in FIGURE 13*b*. Thus, the 5 cycles of the waveform 192, embraced between the arrows 198 and 200, will be compressed into a shorter time interval as shown by the 5 cycles in FIGURE 13*b*. However, due to the logarithmic nature of the original function 192, the zero crossings of the echo 202 will be found to exactly coincide, as indicated by dotted lines 204 and 206, with the zero crossings of another portion of the original function 192. Thus, it is sometimes desirable to provide a reference record at the receiving location which corresponds to a magnitude-versus-time function of the character shown at 192 in FIGURE 13*a*, which is longer in duration than that portion of the function used to determine the waveform of the transmitted signal. Since any 3 successive zero crossings of the original wave are spaced apart by two respectively different values of time, with the value of the ratio between these two different values of time always being equal to a fixed constant for any given waveform, linear time distortion of any portion of the original function will permit this distorted portion to find agreement with another portion of the function.

The advantages of conforming the transmitted wave in signalling systems, of the type under consideration, to the general logarithmic magnitude-versus-time function defined above and illustrated by way of example at 192, in FIGURE 13*a*, may be easily seen by considering one of the previous choices of functions considered above, namely $$O_0(t)=\cos \omega_0 t$$

which gives rise to the transmitted function $$S(t)=\sum_{j=0}^{J} \cos \omega_0 t(1+k)^j$$

and its echo, after delay correction $$Q(t)=\sum_{j=0}^{J} \cos \omega_0 t(1+k)^{j+m}$$

where the exponent $m$ represents the additional time compression due to Doppler.

In generating the product $S(t)Q(t)$ needed to yield the correlation function, certain undesired cross-modulation terms are generated, which are typically of the form $$\cos \omega_0 t[(1+k)^{j+m}-(1+k)^i]$$

for the lower sideband. (The upper sideband may be ignored.) If the integration time is finite, as is always the case practically, these cross-modulation terms represent additional noise in the circuit. Of course, the longer the integration time, the less important are these noise contributions. Nevertheless, they are always present in some measure. With this as the background, the special choice $$S(t)=\sin A_0 \ln (t-t_\infty)$$

and its echo $$Q(t)=\sin A_0 \ln [t(1+k)^m-t_\infty]$$

yield a product $S(t)Q(t)$, whose lower sideband is of the form $$\cos A_0\{\ln [t(1+k)^m-t_\infty]-\ln [t-t_\infty]\}$$

which on integration yields a noise free correlation function. There are no cross terms. Hence in those cases where there is a limitation imposed on the availavle integration time, this specific choice yields somewhat better output signal to noise ratios than in the cases where $S(t)$ is formed by summing a set of time compressed versions of a function.

A further particularly useful form of Doppler compensated signal, falling within the purview of the present invention, may be developed very simply by means of the arrangement illustrated in FIGURE 14. Here, a band pass filter 280 is adapted for excitation by a sharp pulse 210 delivered by a pulse source 211. The output of the band pass filter is then applied to an "and" gate 212 actuated by a pulse 210*d* to conditionally pass the signal delivered by the band pass filter 280. The pulse 210*d* is nothing more than a delayed representation of the sharp pulse 210 and is developed by means of a delay line 214 acting in combination with a multivibrator 216.

In the operation of the arrangement in FIGURE 14, the pulse 210, upon exciting the band pass filter 280, will cause the development, at the output of the filter, of a waveform exemplified at 218, in FIGURE 15. This is a typical ringing waveform characterizing band pass filters when shock excited by a short duration pulse. It will be noted, however, that the gate 212 is actuated by the pulse 210*d* to pass the ringing signal developed by the filter 280 only during a time substantially after the main epoch of the waveform 218. This time is generally indicated between the arrows 222 and 224. As brought out hereinabove, the resulting signal 226 passed by the gate in FIGURE 14, is of a Doppler compensated variety and may be used directly to control the waveform of a signal launched by the transmitter in a signal correlation type signalling system.

From the above, it will be seen that the present invention also provides means for realizing a unique form of signalling system in which the energy of a wave launched by a transmitter may be primarily made up of waveform components which are Doppler compensated. More specifically, the entire energy of the wave, if primarily attributable to Doppler nullifying or Doppler tolerant waveforms, falling within the classes defined above, and receiving means are provided which are responsive substantially only to those classes of received signals, the entire signalling system becomes virtually immune to the influence of common forms of time distortion.

We claim:

1. In a signal communication system for communicating signal intelligence between a transmitting system and a receiving system over a communication path, the effective length of which communication path is subject to variation as a function of time during the communication of signal intelligence, the combination of: record-bearing means included in the receiving system bearing a record of data defining a prescribed Doppler nullifying function of magnitude versus time; means included in the transmitting system for generating and launching over the communication path a complex signal, substantially the entire energy represented by said complex signal being primarily attributable to a waveform based upon the magnitude-versus-time function defined by the data borne by said record-bearing means; and means included in said receiving system and responsive to signals received over the communication path for correlating the data borne by said record-bearing means with respect to the signals received over the communication path.

2. A signal transmitting system for launching a wave designated for selective reception by a receiving system, comprising in combination: means for launching wave energy, the waveform of which is determined by the waveform of control signals to which said launching means is responsive; and means coupled with said launching means for delivering thereto a control signal, the waveform of which is such that substantially the entire energy launched by said means for launching wave energy is defined by at least one logarithmic magnitude-versus-time function of a character such that, when expressed on a logarithmic time scale, the function appears periodic.

3. In an echo range determining system for detecting objects which conditionally bear relative motion with respect to the range determining system, the combination of: burst producing means for producing an electrical signal burst of finite time, said burst being substantially fully definable by waveform components each of which is, in turn, described by an amplitude-versus-time function defining a plurality of zero crossings about its axis, the time duration between any two zero crossings being substantially equal to the product of a given constant multiplied by the time duration between one of said two zero crossings and the next immediate higher time value zero crossing; means responsive to said burst producing means for effectively launching energy representing the waveform of said burst into an environment in which an object may be present; echo receiving means for receiving echo information including representations of said launched energy as conditionally reflected from objects in the launching environment; signal correlation means having reference signal information representing the amplitude-versus-time functions describing the waveform components defining said burst and means for accepting echo information from said echo receiving means for cross-correlating said echo information with said reference signal information; and means responsive to said signal-correlation means for detecting what portions, if any, of the received echo information effectively contain representations of said reflected energy thereby to develop range information as to the distances between the system and objects conditionally present in the launching environment.

4. In a signalling system, the combination of: means for generating and launching a specific wave, the form of which substantially fully conforms to one of a unique class of waveforms resulting from the linear combination of a plurality of time-distorted versions of some oscillatory magnitude-versus-time function; wave receiving means for receiving waves launched by said launching means; correlation means coupled to said wave receiving means for correlating received waves with stored reference waveform information; and storage means coupled to said correlation means storing, for correlation purposes, reference waveform information depicting a waveform substantially identical to the specific waveform launched by said launching means.

5. In a signalling system in which the launching of a wave of specified waveform by a transmitting apparatus is to be selectively detected within an associated receiving apparatus by comparing, through signal correlation processes, the waveform of waves received by the receiving apparatus with a reference wave of the same specified waveform as defined by information held by a record-bearing means within the receiving apparatus, said signalling system being subject to time distortion influences which may impose substantial time distortion upon the launched wave, the received wave and the reference wave, the combination of: record-bearing means, included in the receiving apparatus bearing a record of a prescribed complex waveform substantially solely defined by the combination of a plurality of time-distorted versions of some oscillatory magnitude-versus-time function, any amplitude modulation function conditionally acting upon said oscillatory function being of a character which is always of the same sign; and correlating means included in the receiving system and operatively coupled to said record-bearing means for correlating the waveform of waves received by the receiving system with said prescribed complex waveform defined by the record borne by said record-bearing means.

6. In a signalling system, the combination of: means for generating and launching a wave, a substantial portion of the energy represented by said wave being attributable to a specified wave component, the form of which substantially fully conforms to one of a unique class of waveforms producible by the linear combination of a plurality of time-distorted versions of some oscillatory magnitude-versus-time function; wave receiving means for receiving waves launched by said launching means; correlation means coupled to said wave receiving means for correlating received waves with stored reference waveform information; and storage means coupled to said correlation means storing, for correlation purposes, reference waveform information depicting a waveform substantially identical to said specified waveform component.

References Cited in the file of this patent

UNITED STATES PATENTS

| | | |
|---|---|---|
| 2,638,586 | Guanella | May 12, 1953 |
| 2,678,997 | Darlington | May 18, 1954 |
| 2,753,448 | Rines | July 3, 1956 |
| 2,800,654 | De Rosa | July 23, 1957 |

FOREIGN PATENTS

| | | |
|---|---|---|
| 315,671 | Great Britain | 1931 |